United States Patent
Laughlin (12) 
(10) Patent No.: US 6,236,778 B1
(45) Date of Patent: May 22, 2001

(54) FRUSTRATED TOTAL INTERNAL REFLECTION BUS AND METHOD OF OPERATION

(75) Inventor: Richard H. Laughlin, Richardson, TX (US)

(73) Assignee: Optical Switch Corporation, Richardson, TX (US)

( * ) Notice: Subject to any disclaimer, the term of this patent is extended or adjusted under 35 U.S.C. 154(b) by 0 days.

(21) Appl. No.: 09/212,616

(22) Filed: Dec. 16, 1998

(51) Int. Cl.[7] .................................................. G02B 6/26
(52) U.S. Cl. ................................................ 385/24; 385/22
(58) Field of Search .................................. 385/24, 16–23, 385/31

(56) References Cited

U.S. PATENT DOCUMENTS

| Re. 29,194 | 4/1977 | Ambrose et al. ...................... 355/43 |
| 1,967,548 | 7/1934 | Bartels .................................... 240/1 |
| 2,565,514 | 8/1951 | Pajes ........................................ 88/61 |
| 2,997,922 | 8/1961 | Kaprelian ................................ 88/61 |
| 3,338,656 | 8/1967 | Asthelmer ........................... 350/320 |
| 3,376,092 | 4/1968 | Kushner et al. ..................... 350/285 |
| 3,514,183 | 5/1970 | Rabedeau ............................. 350/160 |
| 3,520,595 | 7/1970 | Treuthart ............................. 350/285 |
| 3,559,101 | 1/1971 | Parker et al. ....................... 332/7.51 |
| 3,649,105 | 3/1972 | Treuhart ............................. 350/285 |
| 3,666,358 | 5/1972 | Banks .................................... 353/25 |
| 3,719,411 | 3/1973 | Midwinter ............................. 350/96 |
| 3,770,347 | 11/1973 | Ambrose et al. ..................... 355/43 |
| 3,980,395 | 9/1976 | Giallorenzi et al. ................. 350/160 |
| 4,026,638 | 5/1977 | Govignon ................................ 351/7 |

(List continued on next page.)

FOREIGN PATENT DOCUMENTS

| 281664A5 | 8/1990 | (DE) . |
| 0347563A2 | 12/1989 | (EP) . |
| 0558025A1 | 2/1993 | (EP) . |
| 1215209 | 10/1970 | (GB) . |
| 61232412 | 10/1986 | (JP) . |

OTHER PUBLICATIONS

U.S. Patent Application Serial No. 09/111,455, entitled, "Method and Apparatus for Aligning Optical Fiber," filed Jul. 8, 1998.
U.S. Patent Application Serial No.09/111,570, entitled, "Method and Apparatus for Connecting Optical Fibers," filed Jul. 8, 1998.
U.S. Patent Application Serial No. 09/111,571, entiled, "Method and Apparatus for Aligning Optical Fibers Fibers Using an Alignment Spacer", filed Jul. 8, 1998.
U.S. Patent Application Serial No. 09/244,570, entitled "System and Method for Determining the Condition of an Optical Switch, "filed Feb. 4, 1999.
U.S. Patent Application Serial No. 09/415,506, entitled "Frustrated Total Internal Reflection Switch Using Double Pass Reflection and Method of Operation," filed Oct. 8, 1999.
U.S. Patent Application Serial No. 09/483,742, entitled "System and Method for Beam–Steering using a Reference Signal Feedback," filed Jan. 17, 2000.
"Astarte," Fiber Networks, Inc.(4 pages).
"Piezoelectrically Driven Tip–Tilt Platforms," Physik Instruments (6 pages).

(List continued on next page.)

*Primary Examiner*—Frank G. Font
*Assistant Examiner*—Layla Lauchman
(74) *Attorney, Agent, or Firm*—Baker Botts L.L.P.

(57) ABSTRACT

An optical bus for processing an optical signal includes an optical waveguide and a switchplate. The switchplate has a first position spaced apart from the optical waveguide and a second position in proximal contact with a reflecting surface of the optical waveguide to frustrate the total internal reflection of the optical signal such that the optical signal exits the optical waveguide at an output location.

35 Claims, 3 Drawing Sheets

U.S. PATENT DOCUMENTS

| | | | |
|---|---|---|---|
| 4,121,884 | 10/1978 | Greenwood | 350/96.15 |
| 4,135,791 | 1/1979 | Govignon | 351/7 |
| 4,165,155 | 8/1979 | Gordon, II et al. | 350/285 |
| 4,244,045 | 1/1981 | Nosu et al. | 370/3 |
| 4,249,814 | 2/1981 | Hull et al. | 354/154 |
| 4,278,327 | 7/1981 | McMahon et al. | 350/347 |
| 4,303,302 | 12/1981 | Ramsey et al. | 350/96.2 |
| 4,355,864 | 10/1982 | Soref | 350/96.18 |
| 4,361,911 | 11/1982 | Buser et al. | 455/605 |
| 4,385,799 | 5/1983 | Soref | 350/96.19 |
| 4,452,506 | 6/1984 | Reeve et al. | 350/96.2 |
| 4,456,329 | 6/1984 | Henderson et al. | 350/96.16 |
| 4,474,424 | 10/1984 | Wagner | 350/96.16 |
| 4,482,994 | 11/1984 | Ishikawa | 370/3 |
| 4,498,730 | 2/1985 | Tanaka et al. | 350/96.16 |
| 4,504,121 | 3/1985 | Carlsen et al. | 350/385 |
| 4,521,069 | 6/1985 | Ikeda | 350/96.13 |
| 4,613,203 | 9/1986 | Proctel et al. | 350/6.6 |
| 4,626,066 | 12/1986 | Levinson | 350/96.18 |
| 4,634,239 | 1/1987 | Buhrer | 350/486 |
| 4,657,339 | 4/1987 | Fick | 350/96.2 |
| 4,696,062 | 9/1987 | LaBudde | 455/612 |
| 4,714,326 | 12/1987 | Usui et al. | 350/485 |
| 4,738,500 | 4/1988 | Grupp et al. | 350/6.6 |
| 4,746,179 | 5/1988 | Dahne et al. | 350/96.1 |
| 4,789,215 | 12/1988 | Anderson et al. | 350/96.19 |
| 4,790,621 | 12/1988 | Calaby et al. | 350/96.2 |
| 4,796,263 | 1/1989 | Rampolla | 372/10 |
| 4,814,600 | 3/1989 | Bergström | 250/221 |
| 4,838,637 | 6/1989 | Torok et al. | 350/96.18 |
| 4,927,225 | 5/1990 | Levinson | 350/96.18 |
| 5,000,534 | 3/1991 | Watanabe et al. | 350/96.2 |
| 5,026,138 | 6/1991 | Boudreau et al. | 350/96.2 |
| 5,031,987 | 7/1991 | Norling | 350/96.15 |
| 5,039,192 * | 8/1991 | Basu | 385/31 |
| 5,046,832 | 9/1991 | Bell | 359/305 |
| 5,064,263 | 11/1991 | Stein | 385/14 |
| 5,101,460 | 3/1992 | Richard | 385/37 |
| 5,111,323 | 5/1992 | Tanaka et al. | 359/139 |
| 5,163,105 | 11/1992 | Knoll et al. | 385/44 |
| 5,199,088 | 3/1993 | Magel | 385/18 |
| 5,204,922 | 4/1993 | Weir et al. | 385/18 |
| 5,206,920 | 4/1993 | Cremer et al. | 385/37 |
| 5,208,880 | 5/1993 | Riza et al. | 385/18 |
| 5,221,987 | 6/1993 | Laughlin | 359/222 |
| 5,225,887 | 7/1993 | Lipson et al. | 356/345 |
| 5,227,911 | 7/1993 | Schiller et al. | 359/222 |
| 5,309,455 | 5/1994 | Adachi et al. | 372/25 |
| 5,323,224 | 6/1994 | Wada | 356/73.1 |
| 5,323,477 | 6/1994 | Lebby et al. | 385/129 |
| 5,335,300 | 8/1994 | Hartman et al. | 385/37 |
| 5,343,286 | 8/1994 | Keeble et al. | 3556/73.1 |
| 5,343,541 | 8/1994 | Uken et al. | 385/16 |
| 5,343,546 | 8/1994 | Cronin et al. | 385/52 |
| 5,361,315 | 11/1994 | Lewis et al. | 385/16 |
| 5,369,718 | 11/1994 | Kamata et al. | 385/21 |
| 5,379,142 | 1/1995 | Handa | 359/129 |
| 5,420,947 | 5/1995 | Li et at. | 385/37 |
| 5,436,986 | 7/1995 | Tsai | 385/16 |
| 5,436,991 | 7/1995 | Sunagawa et al. | 385/37 |
| 5,444,801 | 8/1995 | Laughlin | 385/16 |
| 5,457,760 | 10/1995 | Mizrahi | 385/37 |
| 5,479,543 | 12/1995 | Black | 385/31 |
| 5,521,733 | 5/1996 | Akiyama et al. | 359/127 |
| 5,553,175 | 9/1996 | Laughlin | 385/16 |
| 5,555,327 | 9/1996 | Laughlin | 385/16 |
| 5,555,558 | 9/1996 | Laughlin | 385/16 |
| 5,561,541 | 10/1996 | Sharp et al. | 359/66 |
| 5,566,260 | 10/1996 | Laughlin | 385/16 |
| 5,583,683 | 12/1996 | Scobey | 359/127 |
| 5,590,227 | 12/1996 | Osaka et al. | 385/53 |
| 5,594,578 | 1/1997 | Ainslie et al. | 359/127 |
| 5,621,829 | 4/1997 | Ford | 385/22 |
| 5,627,925 | 5/1997 | Alferness et al. | 385/17 |
| 5,640,479 | 6/1997 | Hegg et al. | 385/120 |
| 5,647,033 | 7/1997 | Laughlin | 385/16 |
| 5,652,816 | 7/1997 | Minami et al. | 385/31 |
| 5,664,034 | 9/1997 | Mock | 385/16 |
| 5,699,462 | 12/1997 | Fouguet et al. | 385/18 |
| 5,727,099 | 3/1998 | Harman | 385/52 |
| 5,732,168 | 3/1998 | Donald | 385/16 |
| 5,748,712 | 5/1998 | Buchin | 385/18 |
| 5,774,604 | 6/1998 | McDonald | 385/18 |
| 5,828,799 | 10/1998 | Donald | 385/16 |
| 5,841,916 | 11/1998 | Laughlin | 385/16 |
| 5,875,271 | 2/1999 | Laughlin | 385/16 |
| 5,892,863 | 4/1999 | Presby | 385/16 |
| 5,909,301 | 6/1999 | Laughlin | 359/222 |
| 5,917,641 | 6/1999 | Laughlin | 359/222 |
| 5,953,469 * | 9/1999 | Zhou | 385/22 |
| 6,137,930 * | 10/2000 | Laughlin | 385/34 |

OTHER PUBLICATIONS

"SiTek electro Optics," On–Trak Photonics, Inc. (6 Pages).

Court, et al., "Frustrated Total Internal Reflection and Application of Its Principle to Laser Cavity Design," Jun. 1964/vol. 4, No. 6/Applied Optics pp. 719–726.

Steffen Glockner, Rolf Goring, Bernt Gotz and Andreas Rose; "Piezoelectrically driven micro–optic fiber switches", Optical Engineering, vol. 37, No. 4, Apr. 1998; all.

Bellcore; Technical Reference TR–NWT–001073: "Generic Requirements for Fiber Optic Switches", Jan. 1994; all "SELFOC®Product Guide," *NSG America, Inc,* , Dec., 1996, 26 pages.

Dale Murray, et al., "Scalable Optical Switch Using Rotating Refractive Plates," *AMP Incorporated*, 10 pages, presented at the National Fiber Optics Engineers Conference, Sep. 1998.

Katsuhiko Hirabayashi, Tsuyoshi Yamamoto, and Shigeki Hino; "Optical backplane with free–space optical interconnections using tunable beam deflectors and a minor for bookshelf–assembled terebit per second class asynchronous transfer mode switch"; 1998 Society of Photo–Optical Instrumentation Engineers; all.

Jonathan Krishnamoorthy and Kess Propstra; "A Concept Becomes Reality!JDS Fitel's COADM for Dynamic Wavelength Management"; Product Application Engineers, JDS FITEL; all.

"BeamBox Solid State Optical Switches"; Akzo Nobel ABD; all.

95921362; Dec. 09, 1997; Supplementary European Search Report; all.

* cited by examiner

FRUSTRATED TOTAL INTERNAL REFLECTION BUS AND METHOD OF OPERATION

TECHNICAL FIELD OF THE INVENTION

This invention relates to the field of frustrated total internal reflection devices and more particularly to a frustrated total internal reflection bus.

BACKGROUND OF THE INVENTION

Data is often communicated between components of a system via communication channels called buses. The capacity of a bus is defined by the number of bits of data that a bus can carry simultaneously. Data is communicated between buses or between buses and individual components of the system using switches. Electrical buses and switches are limited, however, in bandwidth capacity, speed, expandability, and susceptibility to cross-talk and interference.

Buses and switches are often integrated in a backplane bus architecture for various systems applications. An important attribute of a backplane bus architecture is the number of components that can be plugged into the backplane. The ability to interconnect individual components, subassemblies, processors, and systems, using a backplane, is an important aspect of systems integration. Many applications today require that the number of slot connections in a backplane bus architecture be expandable to facilitate the interconnection of additional components to perform functions conceived after the backplane was designed. The expandability of traditional backplane bus architectures is limited, however, by fixed bandwidth, fixed slot connections, and other electrical and mechanical constraints.

SUMMARY OF THE INVENTION

In accordance with the present invention, a frustrated total internal reflection bus is provided that substantially eliminates or reduces disadvantages and problems associated with previous bus architectures.

In accordance with one embodiment of the present invention, an optical bus for processing an optical signal includes an optical waveguide having a first reflecting surface and a second reflecting surface. A switchplate coupled to the optical waveguide has a first position spaced apart from the waveguide and a second position in proximal contact with the second reflecting surface of the waveguide to frustrate the total internal reflection of the optical signal such that the optical signal exits the waveguide at an output location on the first reflecting surface of the optical waveguide.

Another embodiment of the present invention is a method for processing an optical signal that includes reflecting the optical signal at a first reflecting surface of an optical waveguide. The method concludes by placing a switchplate in proximal contact with a second reflecting surface of the optical waveguide to frustrate the total internal reflection of the optical signal such that the optical signal exits the optical waveguide at an output location on the first reflecting surface of the optical waveguide.

Technical advantages of the present invention include a frustrated total internal reflection (FTIR) bus that includes, in one embodiment, an optical waveguide that propagates an optical signal by total internal reflection, and any number of switchplates coupled to the optical waveguide. The switchplates may be placed in proximal contact with reflecting surfaces of the optical waveguide to frustrate the total internal reflection of the optical signal such that it exits the optical waveguide at one or more selected output locations along the reflecting surfaces of the waveguide. The FTIR bus may also receive optical signals at one or more input locations along the reflecting surfaces of the waveguide. The present invention provides advantages over prior optical buses that are limited to inputting and outputting optical signals at an end of the bus. By supporting multiple input and output locations for an optical signal along the reflecting surfaces of an optical bus, the present invention provides scalable and expandable input/output capabilities. The input and output locations of the FTIR bus may be permanently configured, dynamically reconfigured, or both to provide a multitude of signal processing and routing capabilities. For example, switchplates may be added to the optical waveguide to expand the number of output locations along its reflecting surfaces.

Further technical advantages of the present invention include optical devices coupled to the optical waveguide at the input and output locations to facilitate enhanced switching, multiplexing, and processing of the optical signal. Since prior optical buses are limited to inputting and outputting the optical signal at an end of the bus, attempts to couple optical devices at these input/output locations are constrained by the limited surface area at either end of the bus. Providing optical devices at input and output locations along the reflecting surfaces of the FTIR bus yields a higher packing density of these devices. In one embodiment, the FTIR bus may perform a signal splitter function so that multiple optical devices coupled to the optical waveguide at different output locations may share the optical signal.

The present invention further includes any number of input FTIR buses and output FTIR buses that interface at selected locations to form an FTIR bus matrix. The interfaces between the FTIR buses of the matrix may be permanently configured, dynamically reconfigured, or both, to provide even more enhanced switching and multiplexing capabilities for processing the optical signal. Other technical advantages of the present invention are evident to one skilled in the art from the attached description, figures, and claims.

BRIEF DESCRIPTION OF THE DRAWINGS

For a more complete understanding of the present invention and its advantages, reference is now made to the following description taken in conjunction with the accompanying figures in which like reference numbers indicate like features and wherein.

DETAILED DESCRIPTION OF THE INVENTION

Figure 1:
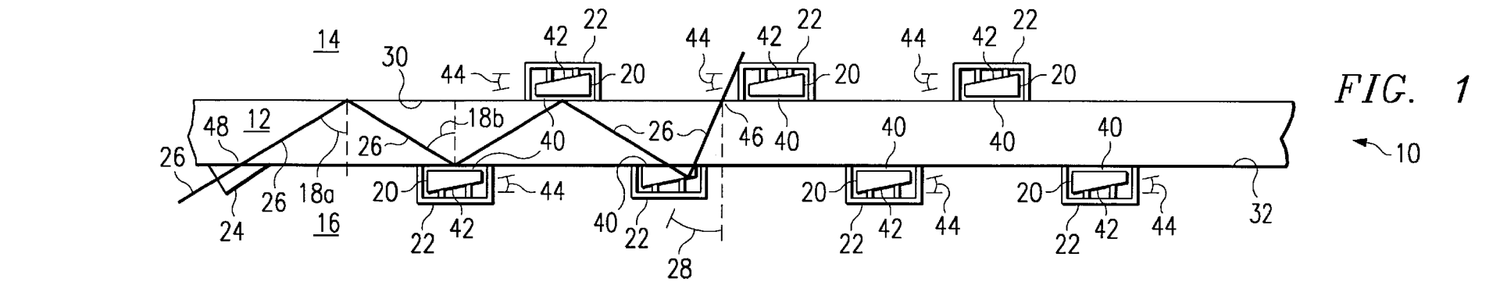
FIG. 1 illustrates one embodiment of a frustrated total internal reflection (FTIR) bus in accordance with the teachings of the present invention.

FIG. 1 illustrates a frustrated total internal reflection (FTIR) bus 10 that includes a first refractive material 12 having an index of refraction $n_1$, a second refractive material 14 having an index of refraction $n_2$, and a third refractive material 16 having an index of refraction $n_3$. FTIR bus 10 further includes switchplates 20, actuators 22, and an optical device 24. First refractive material 12 has critical angles of refraction 18a and 18b that comprise threshold angles above which light traveling in refractive material 12 will be totally internally reflected by the interfaces between material 12 and materials 14 and 16, respectively, provided index of refraction n, is different from index of refraction $n_2$ and index of refraction $n_3$.

In general, optical device 24 introduces an optical signal 26 into first refractive material 12 such that it travels along the length of material 12 totally internally reflecting at angles equal to or greater than critical angles of refraction 18a or 18b each time signal 26 contacts an interface between material 12 and material 14 or 16, respectively. An actuator 22 places a switchplate 20 into proximal contact with refractive material 12 at the interface between material 12 and material 14 or 16 to frustrate the total internal reflection of signal 26 and to reflect optical signal 26 at an angle 28 less than critical angle of refraction 18a or 18b such that optical signal 26 exits refractive material 12.

First refractive material 12 comprises an optical waveguide, referred to as optical waveguide 12, formed by an arrangement of prisms, rhomboids, or any other suitable optically transmissive material that has a first reflecting surface 30 and a second reflecting surface 32. Reflecting surface 30 may be parallel with reflecting surface 32 or at any suitable angle with respect to surface 32 to control the angle of refraction of optical signal 26. In one embodiment, the distance between surfaces 30 and 32 measures approximately one millimeter. First refractive material 12 has an index of refraction n, that characterizes the ratio of the speed of light in a vacuum to the speed of light in material 12. First refractive material 12 may be selected to provide a particular index of refraction n, at a particular wavelength of optical signal 26.

Second refractive material 14 and third refractive material 16 comprise air or any other suitable substance that have indices of refraction, $n_2$ and $n_3$, lower than that of first refractive material 12. Accordingly, if optical signal 26 propagates through refractive material 12 at angles equal to or above critical angles of refraction 18a or 18b, then the interfaces between material 12 and materials 14 or 16 totally internally reflect optical signal 26. The following description of the present invention is detailed with reference to a particular embodiment in which index of refraction $n_2$ of material 14 equals index of refraction $n_3$ of material 16 and, accordingly, critical angle of refraction 18a equals critical angle of refraction 18b. Therefore, critical angles of refraction 18a and 18b are collectively referred to hereinafter as critical angle of refraction 18. It should be understood, however, that index of refraction $n_2$ may be the same as or different from index of refraction $n_3$, and critical angle of refraction 18a may be the same as or different from critical angle of refraction 18b, without deviating from the scope of the present invention.

Switchplates 20 comprise any suitable refractive material having a contact surface 40 and a reflective surface 42. Each switchplate 20 may be formed in many configurations without deviating from the inventive concepts of the present invention. A switchplate 20 couples to material 12 in proximal contact with either first reflecting surface 30 or second reflecting surface 32. The distance between each switchplate 20 is selected in response to the magnitude of critical angle of refraction 18 of material 12. Accordingly, the distance between each switchplate 20 may be selected by adjusting the indices of refraction, $n_1$, $n_2$, or $n_3$, of materials 12, 14, or 16. In one embodiment, as critical angle of refraction 18 increases, switchplates 20 are spaced further apart from each other. Conversely, as critical angle of refraction 18 decreases, switchplates 20 are spaced closer together.

Reflective surface 42 of switchplate 20 is at bias angle 44 in one or more planes with respect to contact surface 40 to direct optical signal 26 to a selected output location 46 on either of reflecting surfaces 30 or 32 when switchplate 20 is in proximal contact with material 12. The reflectivity of surface 42 may be caused by total internal reflection or by reflective material. It is noted that reflective surface 42 of switchplate 20 may also be non-reflective or optically absorbing.

Switchplate 20 has a first position spaced apart from refractive material 12 and a second position in proximal contact with refractive material 12 to frustrate the total internal reflection of optical signal 26. The term proximal contact refers not only to direct contact between switchplate 20 and refractive material 12, but also contemplates any spacing or partial contact between switchplate 20 and refractive material 12 to frustrate the total internal reflection of signal 26 to a desired degree. In one embodiment, the spacing between switchplate 20 and first refractive material 12 may be controlled to perform a variable signal splitter or attenuator function.

Actuators 22 comprise a piezoelectric device, a bimorph transducer, or any other suitable material that displaces switchplate 20 in response to an electrical, thermal, or other appropriate control signal. Activating and deactivating actuator 22 coupled to switchplate 20 causes actuator 22 to bring switchplate 20 into and out of proximal contact with refractive material 12. U.S. Pat. No. 5,555,327 and U.S. patent application Ser. No. 08/923,953 disclose a variety of techniques and components to construct switchplates 20, actuators 22, and combinations thereof that may be used with FTIR bus 10, and are herein incorporated by reference.

Optical device 24 is coupled to first refractive material 12 at an input location 48. Optical device 24 may comprise a prism, a rhomboid, or any other suitable configuration of optically transmissive materials. In one embodiment, optical device 24 has an index of refraction similar to that of first refractive material 12 to allow the introduction of optical signal 26 into first refractive material 12 from either second refractive material 14 or third refractive material 16 without violating Snell's law. In another embodiment, optical device 24 is positioned at a particular angle in relation to the interface between first refractive material 12 and either of second refractive material 14 or third refractive material 16 to allow the introduction of optical signal 26 into first refractive material 12 without violating Snell's law. Optical device 24 may couple to first refractive material 12 at multiple input locations 48 along reflecting surfaces 30 or 32 or at either end of optical waveguide 12 to provide enhanced switching capabilities.

Optical signal 26 comprises visible light, infrared radiation, ultraviolet radiation, or any other suitable optical beam. In one embodiment, optical signal 26 comprises optical energy emitted by a nominally collimated optical source. In a particular embodiment, optical signal 26 comprises optical energy emitted from a laser or light emitting diode (LED) at a wavelength ranging from approximately 1.3 to 1.6 microns.

In operation, optical device 24 introduces optical signal 26 into first refractive material 12 such that it propagates along the longitudinal axis of material 12 totally internally reflecting at angles equal to or greater than critical angle of refraction 18 each time it contacts an interface between material 12 and materials 14 or 16, such as reflecting surfaces 30 or 32. To change the path of optical signal 26, a selected actuator 22 is activated. Activating an actuator 22 brings an associated switchplate 20 into proximal contact with first refractive material 12 such that optical signal 26 enters switchplate 20 and reflects at an angle 28 less than critical angle of refraction 18. This causes optical signal 26 to exit first refractive material 12 at output location 46 in accordance with Snell's law.

Deactivating actuator 22 brings switchplate 20 out of proximal contact with first refractive material 12. Once switchplate 20 is spaced apart from first refractive material 12 a sufficient distance, approximately two times the wavelength of optical signal 26 in material 12, for example, then optical signal 26 again reflects by total internal reflection at reflecting surfaces 30 and 32 of material 12. Controlling the activation of actuators 22 controls the separation between switchplates 20 and first refractive material 12. This allows FTIR bus 10 to be used for switching, modulating, or otherwise processing optical signal 26. By supporting input and output locations for optical signal 26 along reflecting surfaces 30 and 32 of optical waveguide 12 as well as either end of waveguide 12, FTIR bus 10 provides scalable and expandable input/output capabilities.

Figure 2:
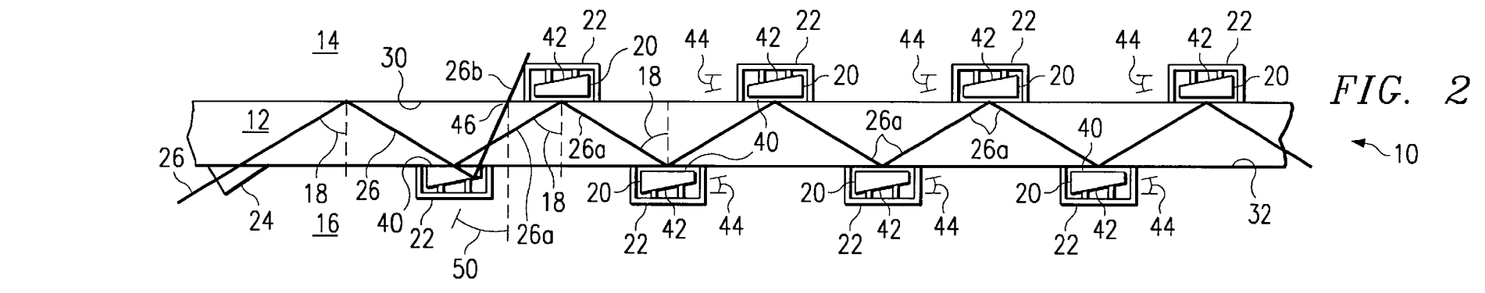
FIG. 2 illustrates another embodiment of the FTIR bus.

FIG. 2 illustrates another embodiment of FTIR bus 10 that provides a variable signal splitter or attenuator function. In this embodiment, a selected actuator 22 may position an associated switchplate 20 in relation to first refractive material 12 such that a portion of optical signal 26 propagating through material 12 is reflected at reflecting surface 30 or 32 of material 12 and a portion of optical signal 26 is reflected at reflective surface 42 of switchplate 20. For example, reflecting surface 32 of material 12 reflects a portion of optical signal 26 as a first optical beam 26a and reflective surface 42 of switchplate 20 reflects a portion of optical signal 26 as a second optical beam 26b. First optical beam 26a continues propagating along the longitudinal axis of material 12 reflecting at angles equal to or greater than critical angle of refraction 18 each time it contacts an interface between material 12 and another refractive material 14 or 16. Second optical beam 26b reflects at an angle 50 less than critical angle of refraction 18 such that it exits material 12 at output location 46 according to Snell's law. In one embodiment, angle 50 equals angle 28.

Actuators 22 may control the spacing of associated switchplates 20 with relation to material 12 to any desired degree. The degree of spacing between switchplates 20 and material 12 determines the portion of optical signal 26 reflected as signal 26a and the portion of optical signal 26 reflected as signal 26b. Signals 26a and 26b may exit optical waveguide 12 at different output locations along reflecting surfaces 30 or 32 of optical waveguide 12 or at either end of waveguide 12. By splitting optical signal 26 into signals 26a and 26b, FTIR bus 10 provides enhanced switching and multiplexing capabilities.

Figure 3:
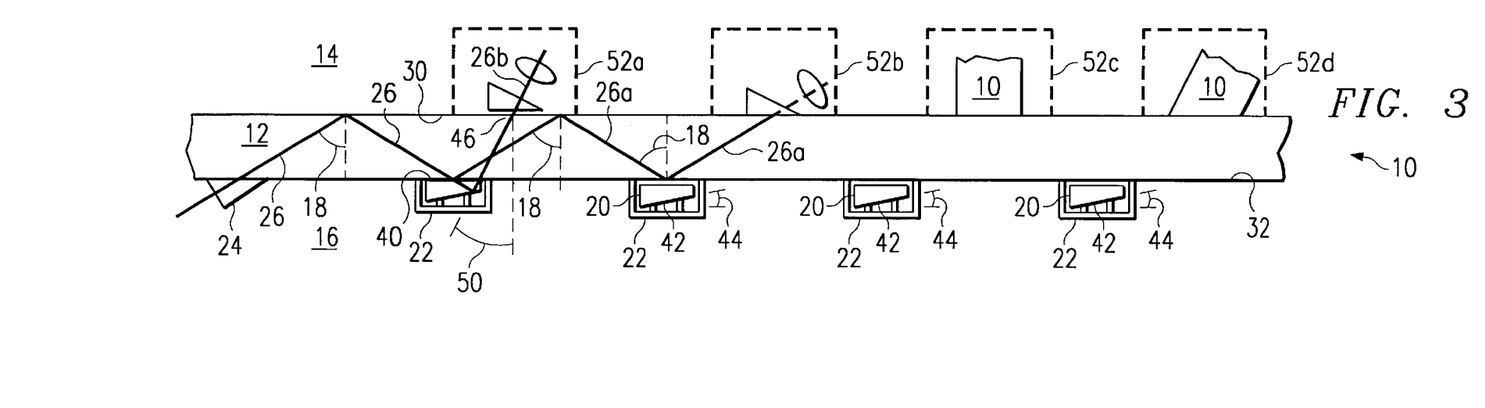
FIG. 3 illustrates another embodiment of the FTIR bus that includes an optical device.

FIG. 3 illustrates another embodiment of FTIR bus 10 that includes output devices 52, such as output devices 52a–52d, coupled to first refractive material 12. An output device 52 may comprise an optical device, an electrical device, a mechanical device, a thermal device, or any combination of optical, electrical, mechanical, or thermal devices that perform further propagation, switching, multiplexing, or other suitable processing on optical signal 26. Output devices 52 may couple to material 12 at locations along reflecting surfaces 30 or 32 to provide a higher packing density of these devices.

Although the following description of the present invention details the operation of FTIR bus 10 using an optical device 52, output device 52 may comprise any combination of optical, electrical, mechanical, or thermal devices, as described above. In a particular embodiment, an optical device 52 may comprise an optical detector, a bundle of optical fibers, another FTIR bus 10, or a prism coupled to a lens, as illustrated in FIG. 3. It should be understood that FIG. 3 depicts switchplates 20 of FTIR bus 10 performing a variable signal splitter function, as described above with reference to FIG. 2, for illustrative purposes only, and that switchplates 20 of FIG. 3 may be strategically placed into or out of proximal contact with material 12 to any desired degree.

In one embodiment, optical device 52a couples to but is spaced apart from first refractive material 12 at output location 46 to provide further processing capabilities on optical signal 26 that exits material 12 while maintaining the total internal reflection properties of material 12. In this embodiment, optical signal 26b exits material 12 at output location 46 according to Snell's law and enters optical device 52a. Optical device 52a performs further processing on signal 26b. For example, optical device 52a may change the angle of optical signal 26b after it exits first refractive material 12. In another example, optical device 52a decollimates signal 26b to introduce it into another optical device 52, such as, for example, an optical fiber.

In another embodiment, optical device 52b couples to and is placed in proximal contact with first refractive material 12 at a selected location where optical signal 26a is normally totally internally reflected by the interface between first refractive material 12 and either second or third refractive materials 14 or 16. In this embodiment, optical device 52b comprises an optically transmissive material having an index of refraction suitable to frustrate the total internal reflection of optical signal 26a by material 12 such that optical signal 26a exits material 12 irrespective of the angle of refraction of optical signal 26a in comparison to critical angle of refraction 18. In a particular embodiment, optical device 52b couples to material 12 using an actuator 22, and has a first position spaced apart from material 12 and a second position in proximal contact with material 12 to frustrate the total internal reflection of signal 26a. For example, an optical signal 26a propagating through first refractive material 12 with an angle of refraction equal to or greater than critical angle of refraction 18 will exit first refractive material 12 provided optical device 52b having a suitable index of refraction is placed in proximal contact with material 12 at a selected location where optical beam 26a contacts the interface between material 12 and either of materials 14 or 16. This embodiment provides an alternative method by which optical signal 26 may exit first refractive material 12, based on the location of optical beam 26a and independent of its angle of refraction.

In yet another embodiment, optical devices 52c and 52d comprise additional FTIR buses 10 that may receive optical signal 26. Upon receiving optical signal 26, the FTIR buses 10 of optical devices 52c and/or 52d may propagate optical signal 26 by total internal reflection as described above with reference to FIGS. 1 and 2. In a particular embodiment, optical device 52d couples to FTIR bus 10 at an angle to adjust the angle of refraction of optical signal 26 within optical device 52d.

Figure 4:
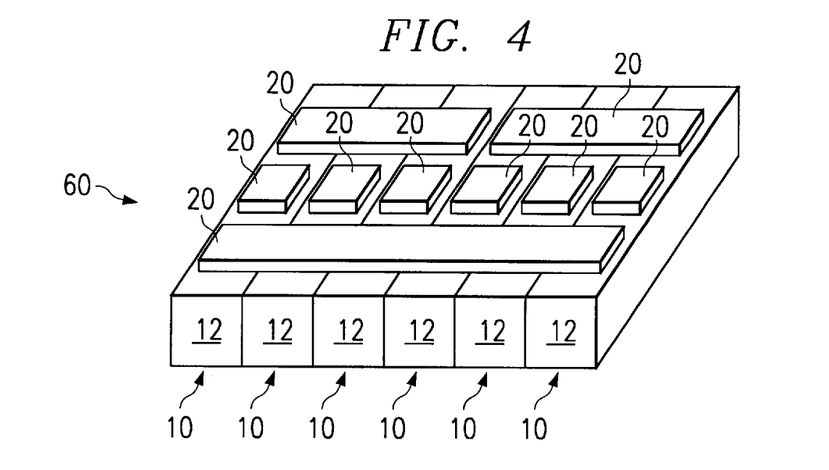
FIG. 4 illustrates one arrangement of a plurality of FTIR buses.

FIG. 4 illustrates an arrangement 60 of FTIR buses 10. In this embodiment, a single actuator 22 may place a single switchplate 20 into and out of proximal contact with one or more FTIR buses 10. Therefore, a single switchplate 20 may simultaneously frustrate the total internal reflection of multiple optical signals 26 propagating through FTIR buses 10 of arrangement 60, using the techniques described above with reference to FIGS. 1 and 2. Placing a single switchplate 20 into and out of proximal contact with one or more FTIR buses 10 to frustrate simultaneously the total internal reflection of one or more associated optical signals 26 facilitates more precise and enhanced switching capabilities. For example, multiple optical signals 26 may be switched in tandem in response to a single control signal. Furthermore, this embodiment conserves power by activating a single actuator 22 to control one or more optical signals 26.

Although FIG. 4 illustrates FTIR buses 10 arranged in proximal contact with each other, FTIR buses 10 may also be arranged spaced apart from each other. In a particular embodiment, a single FTIR bus 10 is provided that has sufficient width to support the propagation of multiple optical signals 26 along its longitudinal axis. In this embodiment, one or more switchplates may frustrate the total internal reflection of the multiple optical signals simultaneously.

Figure 5:
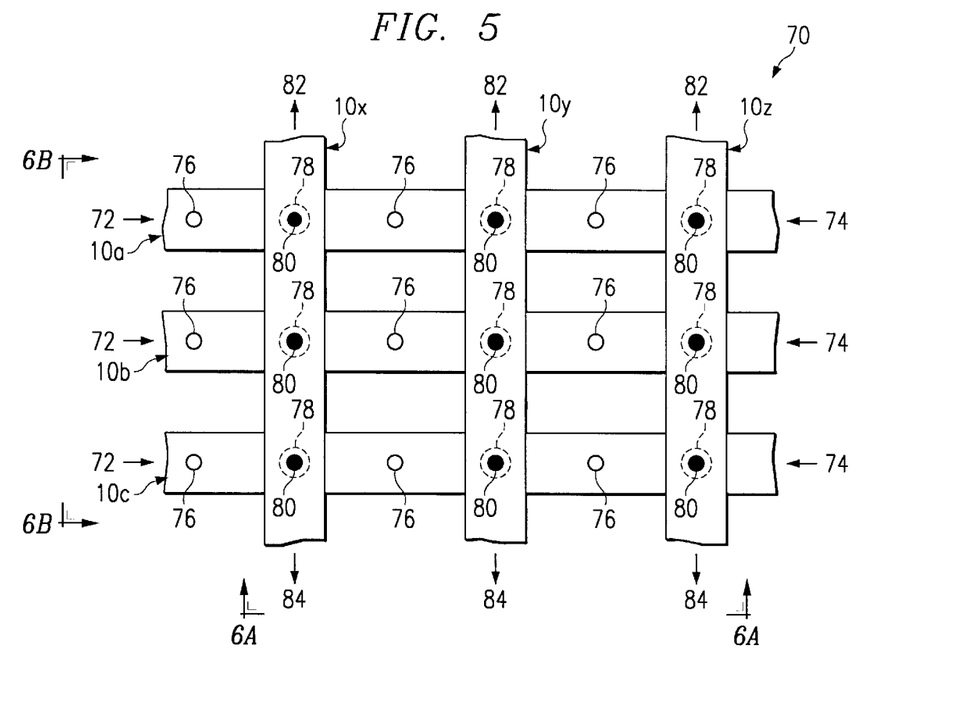
FIG. 5 illustrates a top view of one embodiment of an FTIR bus matrix.

FIG. 5 illustrates a top view of one embodiment of an FTIR bus matrix 70 that includes input FTIR buses 10a–10c and output FTIR buses 10x–10z (FTIR buses 10a–10c and FTIR buses 10x–10z are generally referred to as FTIR buses 10). Although the following description of FIG. 5 is detailed with reference to switching an optical signal 26 from an input FTIR bus 10 to an output FTIR bus 10, it should be understood that the present invention contemplates bidirectional communication of optical signal 26 between input FTIR buses 10 and output FTIR buses 10. Therefore, input FTIR bus 10 and output FTIR bus 10 may each perform both input and output communication of optical signal 26.

In one embodiment, input FTIR buses 10 have first longitudinal axes and output FTIR buses 10 have second longitudinal axes substantially perpendicular to the first longitudinal axes. Although FIG. 5 is illustrated with three input and three output FTIR buses 10 arranged in a perpendicular manner, matrix 70 may include any number and arrangement of input and output FTIR buses 10. Each FTIR bus 10 of FTIR bus matrix 70 includes a first refractive material 12, such as an optical waveguide, a second refractive material 14 (e.g., air), and a third refractive material 16 (e.g., air), and any combination of switchplates 20, actuators 22, optical devices 24, and/or output devices 52, as described above with reference to FIGS. 1 through 3. In one embodiment, a spacer, a switchplate, or any other suitable optical device, couples an output FTIR bus 10 to an input FTIR bus 10 at an appropriate node. Although the following description is detailed with reference to coupling an output FTIR bus 10 above an input FTIR bus 10, an output FTIR bus 10 may couple above or below an input FTIR bus 10. Input and output FTIR buses 10 are spaced according to the critical angles of reflection 18 of the optical waveguides for each FTIR bus 10 and according to the thickness and bias angle 44 of each switchplate 20.

In operation of FTIR bus matrix 70, an optical signal 26 propagates through an optical waveguide of an input FTIR bus 10a–10c in a direction indicated by either arrow 72 or arrow 74, totally internally reflecting at angles equal to or greater than critical angle of refraction 18 each time it contacts an interface between material 12 and materials 14 or 16. For example, signal 26 totally internally reflects at an angle equal to or greater than critical angle of refraction 18 at an interface 76 (indicated by a solid circle) between material 12 and material 14, and at an interface 78 (indicated by a dashed circle) between material 12 and material 16.

Switchplates 20 of FTIR buses 10 may be selectively activated to frustrate the total internal reflection of signal 26 such that optical signal 26 exits an input FTIR bus 10 and enters an output FTIR bus 10 at an appropriate node 80 (indicated by opaque circles). A node 80 comprises an interface through which an optical signal 26 propagates when switched between an input FTIR bus 10 and an output FTIR bus 10. The optical signal 26 then propagates along the longitudinal axis of the optical waveguide of the output FTIR bus 10 in a direction indicated by either arrow 82 or 84, totally internally reflecting at angles equal to or greater than critical angle of refraction 18 each time it contacts an interface between material 12 and materials 14 or 16.

In one embodiment, a first switchplate 20 coupled to an input FTIR bus 10 and a second switchplate 20 coupled to an output FTIR bus 10 operate simultaneously to communicate optical signal 26 between an input FTIR bus 10 and an output FTIR bus 10 at an appropriate node 80. For example, a first switchplate 20 of a particular input FTIR bus 10 is placed in proximal contact with material 12 at an interface 78 such that optical signal 26 enters the switchplate 20 and reflects at an angle less than critical angle of refraction 18 of the optical waveguide. As a result, optical signal 26 exits that input FTIR bus 10 and enters the optical waveguide of a corresponding output FTIR bus 10 at an appropriate node 80.

A first configuration of bus matrix 70 positions the corresponding output FTIR bus 10 along input FTIR bus 10 in alignment with the first switchplate 20 such that switchplate 20 reflects optical signal 26 from interface 78 to node 80 along one plane. In this configuration of bus matrix 70, illustrated in FIGS. 5, 6A, and 6B, angle 44 of the first switchplate 20 may be biased in one plane such that optical signal 26 exits the input FTIR bus 10 and enters the optical waveguide of the corresponding output FTIR bus 10 at node 80. A second configuration of bus matrix 70 positions the corresponding output FTIR bus 10 along input FTIR bus 10 offset from the first switchplate 20 such that first switchplate 20 reflects optical signal 26 from interface 78 to node 80 along two planes. In this configuration, angle 44 of first switchplate 20 may be biased in one or more planes such that optical signal 26 exits the input FTIR bus 10 and enters the optical waveguide of the corresponding output FTIR bus 10 at node 80.

A second switchplate 20 is placed in proximal contact with the optical waveguide of the corresponding output FTIR bus 10 such that optical signal 26 enters the second switchplate 20. Reflective surface 42 of second switchplate 20 is biased at an angle in one or more planes in coordination with first switchplate 20 to reflect signal 26 such that it propagates along the longitudinal axis of the corresponding output FTIR bus 10 reflecting at angles equal to or greater than critical angle of refraction 18 of the optical waveguide.

For example, in the first configuration of bus matrix 70, second switchplate 70 may be biased in one plane to reflect signal 26 such that it propagates along the longitudinal axis of the corresponding output FTIR bus 10. In the second configuration of bus matrix 70, second switchplate 70 may be biased in one or more planes in coordination with angle 44 of first switchplate 70. In particular, if first switchplate 70 is biased in two planes to reflect signal 26 out of FTIR bus 10 at node 80, then second switchplate 70 may be biased in one plane to reflect signal 26 such that it propagates along the longitudinal axis of the corresponding output FTIR bus 10. If first switchplate 70 is biased in one plane to reflect signal 26 out of FTIR bus 10 at node 80, then second switchplate 70 may be biased in two planes to reflect signal 26 such that it propagates along the longitudinal axis of the corresponding output FTIR bus 10. Therefore, signal 26 propagates along the longitudinal axis of the output FTIR bus 10 in a direction indicated by either arrow 82 or arrow 84 depending upon bias angle 44 of second switchplate 20.

In another embodiment, reflective surface 42 of a single switchplate 20 placed in proximal contact with an optical waveguide of an input FTIR bus 10 is biased in two or more planes. A first configuration of bus matrix 70 positions a corresponding output FTIR bus 10 along input FTIR bus 10 in alignment with the switchplate 20 such that switchplate 20 reflects optical signal 26 from interface 78 to node 80 along one plane. In this configuration of bus matrix 70, angle 44 of switchplate 20 is biased in a first plane and a second plane. Switchplate 20 biased in the first plane reflects optical signal 26 at an angle that is less than critical angle of refraction 18 of the optical waveguide such that signal 26 exits the input FTIR bus 10 at a node 80. The same switchplate 20 biased in the second plane further reflects the optical signal 26 at an angle such that signal 26 enters an optical waveguide of a corresponding output FTIR bus 10 at node 80 and propagates along the longitudinal axis of the output FTIR bus 10 reflecting at angles equal to or greater than critical angle of refraction 18 of the optical waveguide.

A second configuration of bus matrix 70 positions a corresponding output FTIR bus 10 along input FTIR bus 10 offset from the switchplate 20 such that switchplate 20 reflects optical signal 26 from interface 78 to node 80 along two planes. In this configuration of bus matrix 70, angle 44 of switchplate 20 is biased in two or more planes. Switchplate 20 biased in a first plane and a second plane reflects optical signal 26 at an angle that is less than critical angle of refraction 18 of the optical waveguide such that signal 26 exits the input FTIR bus 10 at node 80. The same switchplate further reflects the optical signal at an angle such that signal 26 enters an optical waveguide of the corresponding output FTIR bus 10 at node 80 and propagates along the longitudinal axis of the output FTIR bus 10 reflecting at angles equal to or greater than critical angle of refraction 18 of the optical waveguide. In this embodiment, therefore, a single switchplate 20 biased in two or more planes and placed in proximal contact with an optical waveguide of an input FTIR bus 10 may communicate optical signal 26 from an input FTIR bus 10 to an output FTIR bus 10 at an appropriate node 80 such that optical signal 26 propagates along the longitudinal axis of the output FTIR bus 10.

By activating the appropriate actuators 22 and by placing the appropriate switchplates 20 in proximal contact with the appropriate optical waveguides, matrix 70 performs enhanced switching, multiplexing, and other suitable processing on optical signal 26. Specifically, by placing any particular pattern of switchplates 20 in proximal contact with the appropriate optical waveguides, matrix 70 generates a desired mapping of signals 26 from input FTIR buses 10a–10c to output FTIR buses 10x–10z, or vice versa. In one embodiment, an optical signal 26 from any input FTIR bus 10 may be switched to any output FTIR bus 10 if the designated output FTIR bus 10 is not already propagating another optical signal 26.

Figure 6A:
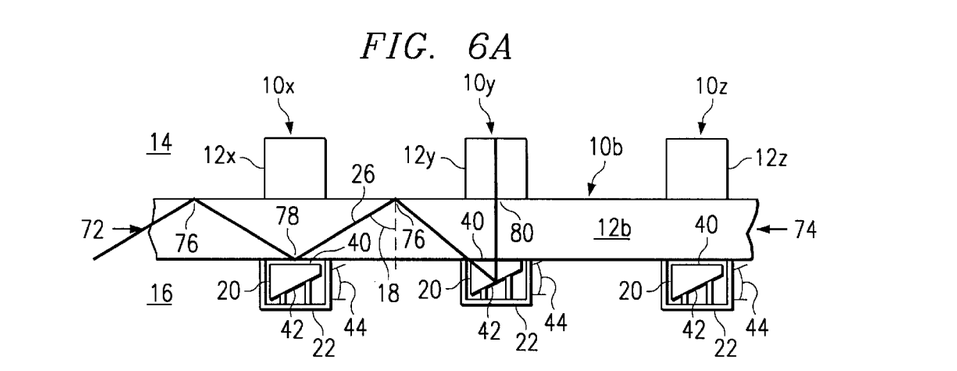
FIG. 6A illustrates a cross-sectional view of the FTIR bus matrix taken along lines 6A—6A of FIG. 5.
Figure 6B:
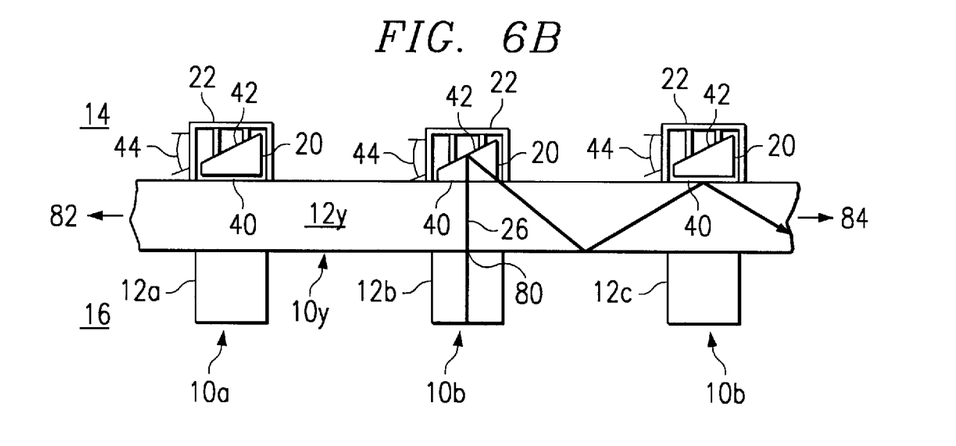
FIG. 6B illustrates a cross-sectional view of the FTIR bus matrix taken along lines 6B—6B of FIG. 5.

FIGS. 6A and 6B illustrate an optical signal 26 propagating along the longitudinal axis of input FTIR bus 10b in a direction indicated by arrow 72. A switchplate 20 frustrates the total internal reflection of optical signal 26 such that it exits FTIR bus 10b, enters output FTIR bus 10y, and propagates along the longitudinal axis of FTIR bus 10y in a direction indicated by arrow 84. In particular, FIG. 6A illustrates a cross-sectional view of FTIR bus matrix 70 taken along lines 6A—6A of FIG. 5. FTIR bus matrix 70 includes the optical waveguide 12b of input FTIR bus 10b, the optical waveguides 12x–12z of output FTIR buses 10x–10z, and switchplates 20 coupled to optical waveguide 12b by actuators 22. Optical signal 26 propagates along the longitudinal axis of optical waveguide 12b totally internally reflecting at angles equal to or greater than critical angle of refraction 18 of optical waveguide 12b each time it contacts an interface between material 12 of optical waveguide 12b and materials 14 or 16. A selected actuator 22 places an associated switchplate 20 into proximal contact with optical waveguide 12b to frustrate the total internal reflection of optical signal 26 such that it exits optical waveguide 12b of input FTIR bus 10b and enters optical waveguide 12y of output FTIR bus 10y at node 80.

FIG. 6B illustrates a cross-sectional view of FTIR bus matrix 70 taken along lines 6B—6B of FIG. 5. FTIR bus matrix 70 includes the optical waveguides 12a–12c of input FTIR buses 10a–10c, the optical waveguide 12y of output FTIR bus 10y, and switchplates 20 coupled to optical waveguide 12y by actuators 22. As discussed above, optical signal 26 exits FTIR bus 10b and enters output FTIR bus 10y at node 80. Actuator 22 places switchplate 20 in proximal contact with optical waveguide 12y of output FTIR bus 10y. In one embodiment, switchplate 20 of output FTIR bus 10y and switchplate 20 of input FTIR bus 10b are placed in proximal contact with the appropriate optical waveguides 12 simultaneously to provide a precise communication of signal 26 between FTIR buses 10b and 10y. Reflective surface 42 of switchplate 20 is at a bias angle 44 with respect to contact surface 40 to reflect signal 26 such that it propagates along the longitudinal axis of output FTIR bus 10y reflecting at angles equal to or greater than critical angle of refraction 18 of optical waveguide 12y. In one embodiment, reflective surface 42 of switchplate 20 reflects signal 26 such that it propagates along the longitudinal axis of output FTIR bus 10y in a direction indicated by arrow 84. Although FIG. 6B is illustrated with reference to propagating signal 26 along the longitudinal axis of output FTIR bus 10y in a direction indicated by arrow 84, reflective surface 42 of switchplate 20 may have a bias angle 44 sufficient to propagate signal 26 along the longitudinal axis of output FTIR bus 10y in a direction indicated by arrow 82. In a particular embodiment, switchplate 20 is dynamically and selectively rotated about an appropriate axis to propagate signal 26 in a selected direction indicated by either arrow 82 or 84. Once switchplates 20 of input FTIR bus 10b and output FTIR bus 10y are placed in proximal contact with the appropriate optical waveguides, FTIR bus matrix 70 may communicate optical signal 26 bidirectionally between FTIR buses 10b and 10y.

Although the present invention has been described in several embodiments, a myriad of changes, variations, alterations, transformations, and modifications may be suggested to one skilled in the art, and it is intended that the present invention encompass such changes, variations, alternations, transformations, and modifications as falls within the spirit and scope of the appended claims.

What is claimed is:

1. An optical bus for processing an optical signal, comprising:
    an optical waveguide having a first reflecting surface and a second reflecting surface; and
    a switchplate coupled to the optical waveguide, the switchplate having a first position spaced apart from the optical waveguide and a second position in proximal contact with the second reflecting surface of the optical waveguide to frustrate the total internal reflection of the optical signal such that the optical signal exits the optical waveguide at an output location on the first reflecting surface of the optical waveguide.

2. The optical bus of claim 1, further comprising a second switchplate coupled to the optical waveguide, the second switchplate having a first position spaced apart from the optical waveguide and a second position in proximal contact with the first reflecting surface of the optical waveguide to frustrate the total internal reflection of the optical signal such that the optical signal exits the optical waveguide at a second output location on the second reflecting surface of the optical waveguide.

3. The optical bus of claim 1, further comprising an optical device coupled to the optical waveguide and operable to communicate the optical signal into the optical waveguide.

4. The optical bus of claim 1, wherein the optical signal comprises a nominally collimated optical signal.

5. The optical bus of claim 1, further comprising an actuator coupled to the switchplate and operable to position the switchplate in a selected one of the first position and the second position in response to a control signal.

6. The optical bus of claim 1, further comprising an actuator coupled to the switchplate and operable to vary controllably the spacing between the switchplate and the optical waveguide to generate a first optical beam and a second optical beam.

7. The optical bus of claim 1, further comprising an optical device coupled to and in proximal contact with the optical waveguide at a selected location, the optical device operable to frustrate the total internal reflection of the optical signal such that the optical signal exits the waveguide at the selected location.

8. The optical bus of claim 7, wherein the optical device comprises a second optical waveguide.

9. The optical bus of claim 7, wherein the optical device comprises a decollimating lens.

10. The optical bus of claim 7, wherein the optical waveguide has a first index of refraction and the optical device has a second index of refraction substantially similar to the first index of refraction.

11. The optical bus of claim 1, further comprising an optical device coupled to and spaced apart from the optical waveguide at the output location, the optical device operable to receive the optical signal that exits the optical waveguide.

12. The optical bus of claim 11, wherein the optical device comprises a second optical waveguide.

13. The optical bus of claim 11, wherein the optical device comprises a decollimating lens.

14. The optical bus of claim 1, wherein the switchplate further comprises:
a contact surface operable to contact proximally the optical waveguide; and
a reflective surface having a bias angle with respect to the contact surface to direct the optical signal to the output location.

15. The optical bus of claim 1, wherein the first reflecting surface of the optical waveguide is substantially parallel to the second reflecting surface.

16. A method for processing an optical signal, comprising:
reflecting an optical signal at a first reflecting surface of an optical waveguide; and
placing a switchplate in proximal contact with a second reflecting surface of the optical waveguide to frustrate the total internal reflection of the optical signal such that the optical signal exits the optical waveguide at an output location on the first reflecting surface of the optical waveguide.

17. The method of claim 16, wherein the optical signal comprises a nominally collimated optical signal.

18. The method of claim 16, wherein the switchplate further comprises:
a contact surface operable to contact proximally the optical waveguide; and
a reflective surface having a bias angle with respect to the contact surface to direct the optical signal to the output location.

19. The method of claim 16, further comprising placing an optical device in proximal contact with the optical waveguide at a selected location, the optical device operable to frustrate the total internal reflection of the optical signal such that the optical signal exits the waveguide at the selected location.

20. The method of claim 19, wherein the optical device comprises a second optical waveguide.

21. The method of claim 19, wherein the optical device comprises a decollimating lens.

22. The method of claim 19, wherein the optical waveguide has a first index of refraction and the optical device has a second index of refraction substantially similar to the first index of refraction.

23. The method of claim 16, further comprising placing an optical device spaced apart from the optical waveguide, the optical device operable to process the optical signal that exits the optical waveguide.

24. The method of claim 23, wherein the optical device comprises a second optical waveguide.

25. The method of claim 23, wherein the optical device comprises a decollimating lens.

26. The method of claim 16, further comprising controllably varying the spacing between the switchplate and the optical waveguide to generate a first optical beam and a second optical beam.

27. The method of claim 16, further comprising receiving the optical signal at a second optical waveguide at the output location.

28. The method of claim 16, wherein the first reflecting surface of the optical waveguide is substantially parallel to the second reflecting surface.

29. A device for processing an optical signal, comprising:
an input optical waveguide having a first reflecting surface and a second reflecting surface;
a switchplate coupled to the input optical waveguide, the switchplate having a first position spaced apart from the input optical waveguide and a second position in proximal contact with the second reflecting surface of the input optical waveguide to frustrate the total internal reflection of the optical signal such that the optical signal exits at an output location on the first reflecting surface of the input optical waveguide; and
an output optical waveguide coupled to the input optical waveguide at the output location and operable to receive the optical signal.

30. The device of claim 29, further comprising a second switchplate coupled to the output optical waveguide, the second switchplate having a first position spaced apart from the output optical waveguide and a second position in proximal contact with the output optical waveguide to reflect the optical signal such that the optical signal propagates along the longitudinal axis of the output optical waveguide.

31. The device of claim 29, wherein the switchplate further comprises:
a contact surface operable to contact proximally the input optical waveguide; and a reflective surface having a bias angle in a first plane and a second plane with respect to the contact surface, the reflective surface operable to frustrate the total internal reflection of the optical signal such that the optical signal exits at the output location in response to the bias angle in the first plane, the reflective surface further operable to reflect the optical signal such that the optical signal propagates along the longitudinal axis of the output optical waveguide in response to the bias angle in the second plane.

32. The device of claim 29, wherein the input optical waveguide has a first longitudinal axis and the output optical waveguide has a second longitudinal axis substantially perpendicular to the first longitudinal axis.

33. The device of claim 29, further comprising:
a second switchplate coupled to the input optical waveguide, the second switchplate having a first position spaced apart from the input optical waveguide and a second position in proximal contact with the second reflecting surface of the input optical waveguide to frustrate the total internal reflection of the optical signal such that the optical signal exits at a second output location on the first reflecting surface of the input optical waveguide; and a second output optical waveguide coupled to the input optical waveguide at the second output location and operable to receive the optical signal.

34. The device of claim 29, further comprising:
a second input optical waveguide having a first reflecting surface and a second reflecting surface; and
a second switchplate coupled to the second input optical waveguide, the second switchplate having a first position spaced apart from the second input optical waveguide and a second position in proximal contact with the second reflecting surface of the second input optical waveguide to frustrate the total internal reflection of a second optical signal such that the second optical signal exits at a second output location on the first reflecting surface of the second input optical waveguide;
wherein the output optical waveguide couples to the second input optical waveguide at the second output location and is operable to receive the second optical signal.

35. The device of claim 29, wherein the first reflecting surface of the input optical waveguide is substantially parallel to the second reflecting surface.

* * * * *